United States Patent
Gotan et al.

(10) Patent No.: US 8,263,031 B2
(45) Date of Patent: Sep. 11, 2012

(54) METHOD FOR PURIFYING EXHAUST GAS AND SYSTEM THEREFOR

(75) Inventors: Hiroaki Gotan, Aki-gun (JP); Yoshiaki Tomita, Hiroshima (JP); Masashi Naono, Hiroshima (JP); Tamiharu Nakamura, Higashihiroshima (JP); Hiroaki Ishida, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 21 days.

(21) Appl. No.: 13/033,541

(22) Filed: Feb. 23, 2011

(65) Prior Publication Data

US 2011/0236280 A1    Sep. 29, 2011

(30) Foreign Application Priority Data

Mar. 23, 2010    (JP) .................................. 2010-066244

(51) Int. Cl.
B01D 53/56 (2006.01)
B01D 53/94 (2006.01)
F01N 3/10 (2006.01)
F01N 3/18 (2006.01)

(52) U.S. Cl. ............... 423/213.2; 423/213.7; 423/239.1; 423/DIG. 5; 422/105; 422/110; 422/111; 60/276; 60/299; 60/301

(58) Field of Classification Search ............... 423/213.2, 423/213.7, 239.1, DIG. 5; 422/105, 110, 422/111; 60/276, 299, 301
See application file for complete search history.

(56) References Cited

U.S. PATENT DOCUMENTS

| | | | |
|---|---|---|---|
| 7,134,273 B2 * | 11/2006 | Mazur et al. | 60/286 |
| 2010/0024390 A1 * | 2/2010 | Wills et al. | 60/274 |
| 2012/0117954 A1 * | 5/2012 | Yasui et al. | 60/301 |

FOREIGN PATENT DOCUMENTS

JP    2009-167940 A    7/2009

* cited by examiner

*Primary Examiner* — Timothy Vanoy
(74) *Attorney, Agent, or Firm* — Alleman Hall McCoy Russell & Tuttle LLP (57) ABSTRACT

A method is provided for purifying exhaust gas from an engine having an exhaust passage with a selective reducing catalyst and an oxidation catalyst upstream of the selective reducing catalyst. The method calculates an amount of NOx that flows into the selective reducing catalyst; sets an amount of an additive agent to be supplied to the selective reducing catalyst based on the calculated amount of NOx; determines a degradation degree of the oxidation catalyst; determines whether a correction to the amount of the additive agent is necessary based on the determined degradation degree of the oxidation catalyst; corrects the amount of the additive agent to be supplied when the correction is necessary; and supplies the additive agent to the selective reducing catalyst in the corrected amount if the amount is determined to be corrected and in the uncorrected amount if the amount is determined not to be corrected.

7 Claims, 5 Drawing Sheets

METHOD FOR PURIFYING EXHAUST GAS AND SYSTEM THEREFOR

BACKGROUND

The present invention relates to a method and system for purifying exhaust gas from an engine, and more particularly to a method and system for purifying exhaust gas by supplying an additive agent as a reducing agent to a selective reducing catalyst provided in an exhaust passage from an engine.

Conventionally, an exhaust gas purification system has been known which includes a selective reducing catalyst in an exhaust passage from a diesel engine to purify exhaust gas from the engine, as disclosed in Japanese Patent Application Publication 2009-167940. The selective reducing catalyst induces the selective reaction between NOx and a reducing agent even in a coexistent condition with oxygen. The system ejects aqueous urea solution as the reducing agent from the upstream side of the selective reducing catalyst to supply the ejected aqueous urea solution to the catalyst. The ejected aqueous urea solution undergoes pyrolysis under the heat of the exhaust gas or hydrolysis, forming ammonia and carbonic acid gas. The ammonia serves to reduce NOx in the exhaust gas on the selective reducing catalyst.

The system disclosed in the publication additionally includes a diesel particulate filter (hereinafter referred to as DPF) to trap particles in the exhaust gas at the upstream side of the selective reducing catalyst and an oxidation catalyst at the upstream side of the DPF. The oxidation catalyst oxidizes the NO in the exhaust gas into $NO_2$. Then, in the DPF, the carbon components of the particles and the $NO_2$ (including both $NO_2$ originally contained in the exhaust gas and $NO_2$ formed by the function of the oxidation catalyst) react with each other, forming NO and $CO_2$.

In the meantime, the oxidation catalyst provided at the upstream side of the DPF degrades through prolonged exposure to high temperature and its oxidation capability for NO drops correspondingly to the time period. The drop in oxidation capability of the catalyst leads to a decrease in the amount of $NO_2$. As the amount of $NO_2$ formed by the function of the oxidation catalyst decreases, a concentration ratio of NO to $NO_2$ in the exhaust gas at the downstream side of the DPF increases. For the selective reducing catalyst, on the other hand, the amount of ammonia necessary to decompose NO is smaller than that necessary to decompose $NO_2$. If the supply amount of aqueous urea solution (i.e., ammonia) is set with no consideration for the decrease in the amount of $NO_2$ formed by the function of the oxidation catalyst, accordingly, the amount of ammonia unnecessary for NOx purification gradually increases. As a result, the unwanted surplus ammonia may be adversely released into the atmosphere.

In view of the abovementioned problem, it is an object of the present invention to decrease the amount of surplus additive agent unnecessary for NOx purification by supplying a proper amount of the additive agent to a selective reducing catalyst even when an oxidation catalyst at the upstream side of the selective reducing catalyst has degraded.

SUMMARY

In accordance with an aspect of the present invention, there is provided a method for purifying exhaust gas from an engine that arranges in an exhaust passage of the engine a selective reducing catalyst and an oxidation catalyst upstream of the selective reducing catalyst.

The method calculates the amount of NOx that flows into the selective reducing catalyst; sets the amount of the additive agent to be supplied to the selective reducing catalyst based on the calculated amount of the NOx that flows into the selective reducing catalyst; determines the degradation degree of the oxidation catalyst; determines whether a correction is necessary to be made to the amount of the additive agent to be supplied based on the determined degradation degree of the oxidation catalyst; corrects the amount of the additive agent to be supplied when the correction is determined to be necessary; and supplies the additive agent to the selective reducing catalyst in the corrected amount if the amount is determined to be corrected and in the uncorrected amount if the amount is determined not to be corrected.

According to this aspect, first, the amount of NOx flowing into the selective additive agent is calculated. The calculation may be carried out based on an engine operational condition or the amount of NOx as measured by a device for determining the amount of NOx provided at the upstream side of the selective reducing catalyst. Then, the amount of the additive agent to be supplied is determined based on the amount of NOx. Further, the degree of degradation of the oxidation catalyst is determined based on a condition of the oxidation catalyst, such as the history of temperature change of the oxidation catalyst.

Next, a determination is made as to whether a correction is necessary to the amount of the additive agent to be supplied based on the degradation degree of the oxidation catalyst, and a correction is made to the amount if the correction is determined to be necessary. Actually, when the degradation degree of the oxidation catalyst becomes greater, a concentration ratio of NO to $NO_2$ in the NOx flowing into the selective reducing catalyst increases, so that the necessary amount of additive agent becomes correspondingly smaller. By correcting the amount of additive agent to be supplied in consideration for the abovementioned fact, proper adjustment is possible to the amount of the additive agent even if the oxidation catalyst degrades. If the oxidation catalyst has not degraded or has degraded not so much as to be deemed not to have degraded, it may be determined that a correction is unnecessary and no correction is made.

Next, if the correction is made to the amount of the additive agent to be supplied, the additive agent is supplied to the selective reducing catalyst in the corrected amount. Otherwise, the additive agent is supplied to the selective reducing catalyst in the uncorrected amount, in other words, the raw amount that is set based on the amount of NOx with no correction thereto. In this manner, the amount of surplus additive agent unnecessary for NOx purification is properly decreased.

Preferably, if the correction is determined to be necessary, the amount of the additive agent to be supplied may be decreased more greatly as the determined degradation degree increases.

Accordingly, proper adjustment is made to the amount of the additive agent to be supplied, decreasing the surplus amount of the additive agent.

More preferably, the determination of the degradation degree may be made based on the history of temperature change of the oxidation catalyst.

The degradation is largely affected by temperature of the oxidation catalyst and a time period of exposure to the temperature. According to this aspect of the present invention, therefore, the degradation degree of the oxidation catalyst is accurately determined.

Further preferably, the determination of the degradation degree may be made in such a manner that the time integration value of the temperature of the oxidation catalyst is calculated based on the history of temperature change of the oxidation catalyst and the degradation degree is determined to be larger as the time integration value increases.

Accordingly, the degradation degree of the oxidation catalyst is more accurately determined.

According to another aspect of the present invention, there is provided a system for purifying exhaust gas from an engine comprising, a selective reducing catalyst provided in an exhaust passage of the engine; an oxidation catalyst provided upstream of the selective reducing catalyst in the exhaust passage; an additive agent supplying device provided in the exhaust passage to supply an additive agent to the selective reducing catalyst; and a controller.

The controller is configured to: calculate the amount of NOx that flows into the selective reducing catalyst; set the amount of the additive agent to be supplied to the selective reducing catalyst based on the calculated amount of the NOx that flows into the selective reducing catalyst; determine the degradation degree of the oxidation catalyst; determine whether a correction is necessary to be made to the amount of the additive agent to be supplied based on the determined degradation degree of the oxidation catalyst; correct the amount of the additive agent to be supplied when the correction is determined to be necessary; and control the additive agent supplying device to supply the additive agent to the selective reducing catalyst in the corrected amount if the amount is determined to be corrected and in the uncorrected amount if the amount is determined not to be corrected.

According to this aspect, similarly to the abovementioned aspect, a proper amount of the additive agent is supplied to the selective reducing catalyst even when the oxidation catalyst at the upstream side of the selective reducing catalyst has degraded, so that the amount of surplus additive agent unnecessary for NOx purification is decreased.

As explained above, the present invention advantageously decreases the amount of surplus additive agent unnecessary for NOx purification by supplying a proper amount of the additive agent to a selective reducing catalyst even when an oxidation catalyst at the upstream side of the selective reducing catalyst has degraded. Accordingly, the unwanted surplus additive agent, particularly ammonia, is prevented from being released into the atmosphere from the outlet of the exhaust passage.

DETAILED DESCRIPTION OF THE EMBODIMENTS

Hereinafter, one embodiment of the present invention is described with reference to the appended drawings.

Figure 1:
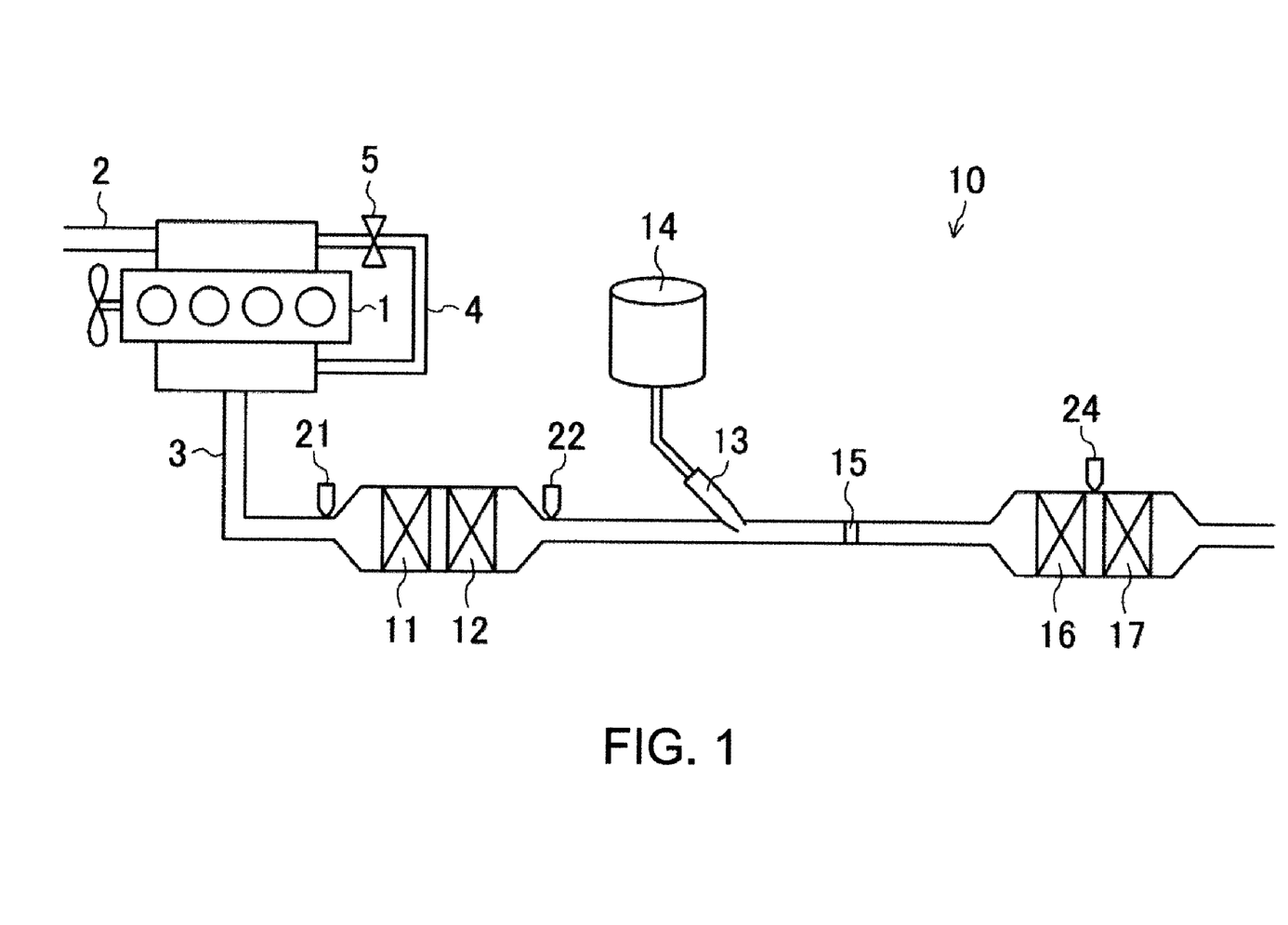
FIG. 1 is a schematic diagram showing an exhaust purification system for an engine according to one embodiment of the present invention.

In FIG. 1, an exhaust purification system 10 of an engine 1 of this embodiment is shown. The engine 1 is a diesel engine including an intake passage 2, an exhaust passage 3, an EGR passage 4 in which a part of exhaust gas of the engine 1 is re-circulated to the intake side, and an EGR valve 5 arranged to the EGR passage 4.

An upstream oxidation catalyst 11 for oxidizing NO in the exhaust gas, a diesel particulate filter (DPF) 12 for trapping particulates in exhaust gas, an aqueous urea solution injection nozzle 13 as an additive agent supply module for injecting aqueous urea solution (correspondent to an additive agent, such as a reducing agent, in the claims) supplied from an aqueous urea solution tank 14 into the exhaust passage 3 and further supplying it to a selective reducing catalyst 16 (described later), a mixing plate 15 for promoting mixing of the aqueous urea solution injected from the aqueous urea solution injection nozzle 13 and the exhaust gas, the selective reducing catalyst 16 for purifying the exhaust gas by being supplied with the aqueous urea solution to selectively reduce NOx in the exhaust gas, and a downstream oxidation catalyst 17 for preventing the release of surplus ammonia unnecessary for the purification of NOx into the atmosphere, the ammonia generated from the aqueous urea solution injected from the aqueous urea solution injection nozzle 13, are arranged in the exhaust passage 3 in this order from the upstream side.

Further, a first temperature sensor 21 arranged upstream of the upstream oxidation catalyst 11 for detecting a temperature of the exhaust gas which flows into the upstream oxidation catalyst 11, a second temperature sensor 22 arranged downstream of the DPF 12 and upstream of the aqueous urea solution injection nozzle 13 for detecting a temperature of the exhaust gas at the location where the said temperature sensor 22 is arranged, and a NOx sensor 24 arranged downstream of the selective reducing catalyst 16 and upstream of the downstream oxidation catalyst 17 for detecting a concentration of the NOx in the exhaust gas at the location where the NOx sensor 24 is arranged, are arranged to the exhaust passage 3. The NOx sensor 24 detects the outflow amount of NOx flowing out from the selective reducing catalyst 16. The temperature detected by the first temperature sensor 21 may be treated as the temperature of the upstream oxidation catalyst 11.

The mixing plate 15 (not illustrated in detail) includes a main body part arranged across the exhaust passage 3. A plurality of portions of the main body part (portions around a central axis of the exhaust passage 3) are cut and bent to the downstream direction. When the exhaust gas passes through the cut portions, the gas flow is disturbed and, thereby, the aqueous urea solution injected at the upstream of the mixing plate 15 and the exhaust gas are stirred and the aqueous urea solution fully spreads into the exhaust gas. Then, the aqueous urea solution is supplied to the selective reducing catalyst 16 in this state.

A purifying reaction mechanism of exhaust gas by the exhaust purification system 10 is as follows.

Exhaust gas exhausted from the engine 1 flows into the upstream oxidation catalyst 11, and a part of NO in the exhaust gas is oxidized by the upstream oxidation catalyst 11 to generate $NO_2$. Here, the corresponding reaction formula is as follows.

$$2NO+O_2 \rightarrow 2NO_2$$

By this oxidation reaction, NO is decreased in the exhaust gas and $NO_2$ is increased.

Further, the exhaust gas flows into the DPF 12, and the particulates contained in the exhaust gas are trapped. Carbon components of the trapped particulates react with a part of $NO_2$ (the $NO_2$ originally contained in the exhaust gas and the NO$_2$ generated by the upstream oxidation catalyst 11) and O$_2$ in the exhaust gas, and are converted into carbon dioxide. The corresponding reaction formulas are as follows.

$$C+2NO_2 \rightarrow 2NO+CO_2$$

$$C+O_2 \rightarrow CO_2$$

By these reactions, NO$_2$ is decreased and NO is increased in the exhaust gas, however a concentration ratio of NO to NO$_2$ in the exhaust gas downstream of the DPF 12 is not the same as that upstream of the upstream oxidation catalyst 11. On the other hand, the amount of NOx itself is the same upstream of the upstream oxidation catalyst 11 and downstream of the DPF 12. That is, the amount of NOx exhausted from the engine 1 and the inflow amount of NOx flowing into the selective reducing catalyst 16 are the same.

Next, aqueous urea solution is injected from the aqueous urea solution injection nozzle 13 to the exhaust gas flown out from the DPF 12. Urea within the aqueous urea solution undergoes a pyrolytic reaction from the heat of the exhaust gas, and generates ammonia and isocyanic acid. The corresponding reaction formula is as follows.

$$CO(NH_2)_2 \rightarrow NH_3+HNCO$$

The pyrolytic reaction occurs at 135° C. or higher and mainly occurs in a section between the aqueous urea solution injection nozzle 13 and the selective reducing catalyst 16 (it also occurs in the selective reducing catalyst 16).

The isocyanic acid generated from the pyrolytic reaction undergoes a hydrolytic reaction and generates ammonia and carbon dioxide. The corresponding reaction formula is as follows.

$$HNCO+H_2O \rightarrow NH_3+CO_2$$

The hydrolytic reaction occurs at 160° C. or higher and mainly occurs in a section between the aqueous urea solution injection nozzle 13 and the selective reducing catalyst 16 (it is also induced within the selective reducing catalyst 16).

At 200° C. or higher, the ammonia generated from urea as described above undergoes a denitration reaction with NO and NO$_2$ by the selective reducing catalyst 16 and reduces the nitrogen oxide to nitrogen and water. The corresponding reaction formulas are as follows.

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

The nitrogen oxide reductive reaction occurs within the selective reducing catalyst 16. Based on these reaction formulas, it can be understood that the amount of ammonia that is needed for the reduction of NO by the selective reducing catalyst 16 is less than the amount of ammonia that is needed for the reduction of NO$_2$.

The surplus amount of ammonia unnecessary for the nitrogen oxide reductive reaction (i.e., the purification of NOx) flows into the downstream oxidation catalyst 17 and is oxidized and reduced to nitrogen and water by the downstream oxidation catalyst 17. The corresponding reaction formula is as follows.

$$4NH_3+3O_2 \rightarrow 2N_2+6H_2O$$

Further, approximately at 200° C. or higher, in addition to the above reaction, a reaction of changing the surplus ammonia into nitrogen monoxide and water by the downstream oxidation catalyst 17 is caused. The corresponding reaction formula is as follows.

$$4NH_3+4NO_2+O_2 \rightarrow 4N_2O+6H_2O$$

Further, approximately at 400° C. or higher, in addition to the above two reactions, a reaction of changing the surplus ammonia into nitric oxide (NO) and water by the downstream oxidation catalyst 17 is caused. The corresponding reaction formula is as follows.

$$4NH_3+5O_2 \rightarrow 2NO+6H_2O$$

Figure 2:
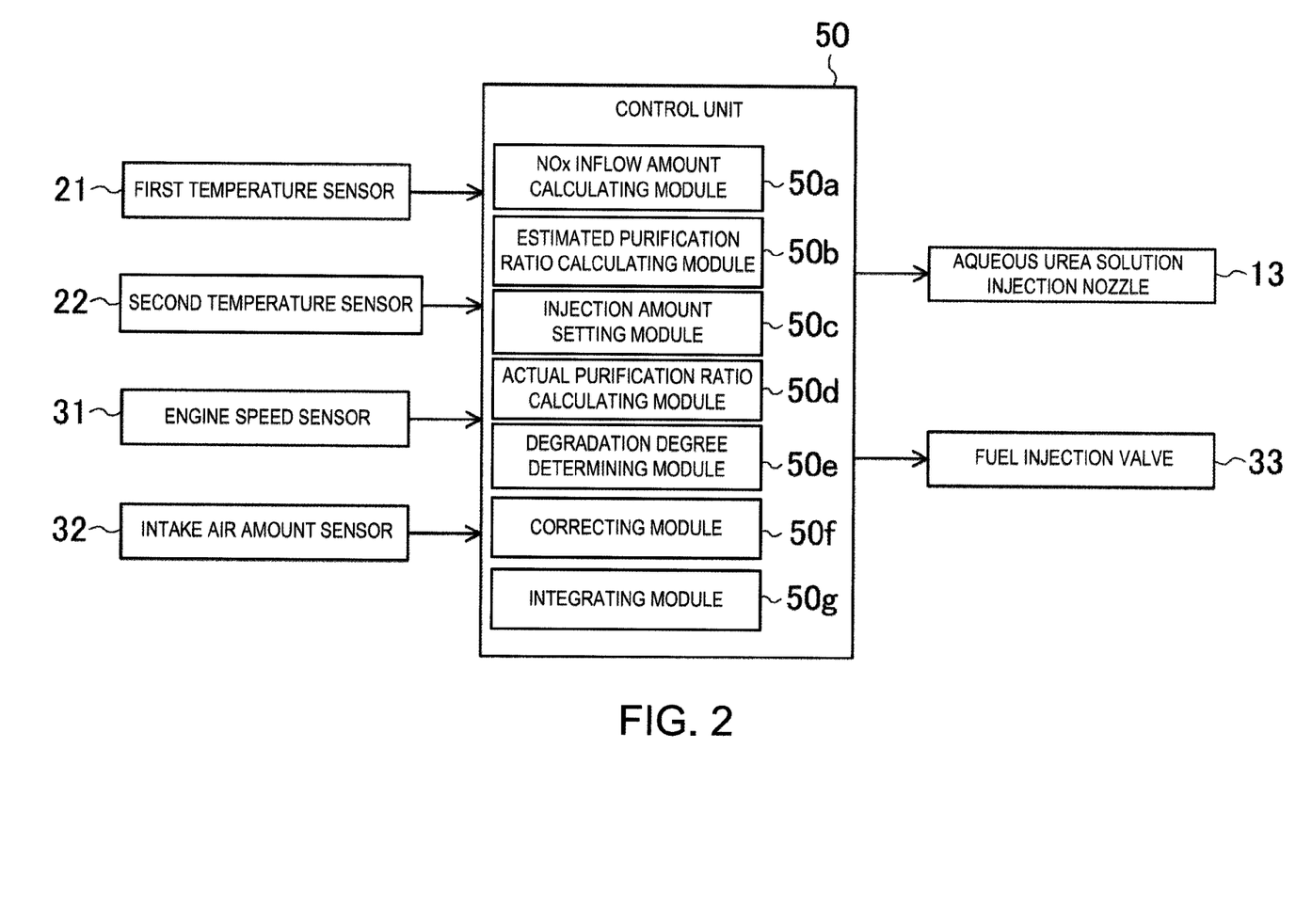
FIG. 2 is a block diagram showing a configuration of a control system of the exhaust purification system.

In FIG. 2, a configuration of a control system of the exhaust purification system 10 is shown. A control unit 50 is a commonly-known, micro-computer-based control device. The control unit 50 includes a central processing unit (CPU) for executing programs, a memory including, for example, a RAM and a ROM for storing programs and data, and an input/output bus for operating inputs and outputs of various signals. The first temperature sensor 21, the second temperature sensor 22, an engine speed sensor 31 for detecting a rotational speed of the engine 1, an intake air amount sensor 32 for detecting an amount of intake air flowing into the intake passage 2, and a plurality of other sensors (not illustrated) for controlling the engine 1, are connected to the control unit 50, and detected signals are inputted from the sensors to the control unit 50. Based on the inputted signals, the control unit 50 controls various actuators such as the aqueous urea solution injection nozzle 13 and a fuel injection valve 33 of the engine 1.

The control unit 50 instructs the aqueous urea solution injection nozzle 13 to inject aqueous urea solution intermittently (at a constant frequency T, for example at 3.3 Hz, in this embodiment). The injection amount (a supply amount to the selective reducing catalyst 16) from the aqueous urea solution injection nozzle 13 is set by an injection amount setting module 50c (described later) provided in the control unit 50 in a manner described later and corrected by a correcting module 50f (described later), and then the aqueous urea solution injection nozzle 13 injects aqueous urea solution by the corrected injection amount.

In order to set the injection amount of aqueous urea solution, the control unit 50 is provided with a NOx inflow amount calculating module 50a for calculating the inflow amount of NOx flowing into the selective reducing catalyst 16, an estimated purification ratio calculating module 50b for calculating an estimated purification ratio of NOx by the selective reducing catalyst 16, and the injection amount setting module 50c (supply amount setting module) for setting the injection amount of aqueous urea solution from the aqueous urea solution injection nozzle 13.

In order to correct the injection amount set by the injection amount setting module 50c, the control unit 50 is further provided with an actual purification ratio calculating module 50d for calculating an actual purification ratio of NOx purified by the selective reducing catalyst 16, a degradation degree determining module 50e for determining a degradation degree of the upstream oxidation catalyst 11, the correcting module 50f for determining whether the correction of the injection amount of the aqueous urea solution is necessary based on the degradation degree of the upstream oxidation catalyst 11, which is determined by the degradation degree determining module 50e, and executing the correction when the correction is determined to be necessary, and an integrating module 50g for integrating surplus amounts (described later) which are calculated by the correcting module 50f. In this embodiment, the correcting module 50f corrects the injection amount of aqueous urea solution when an integrated value (described later) of the surplus amounts is larger than a predetermined value, in addition to the correction based on the degradation degree of the upstream oxidation catalyst 11.

Figure 3:
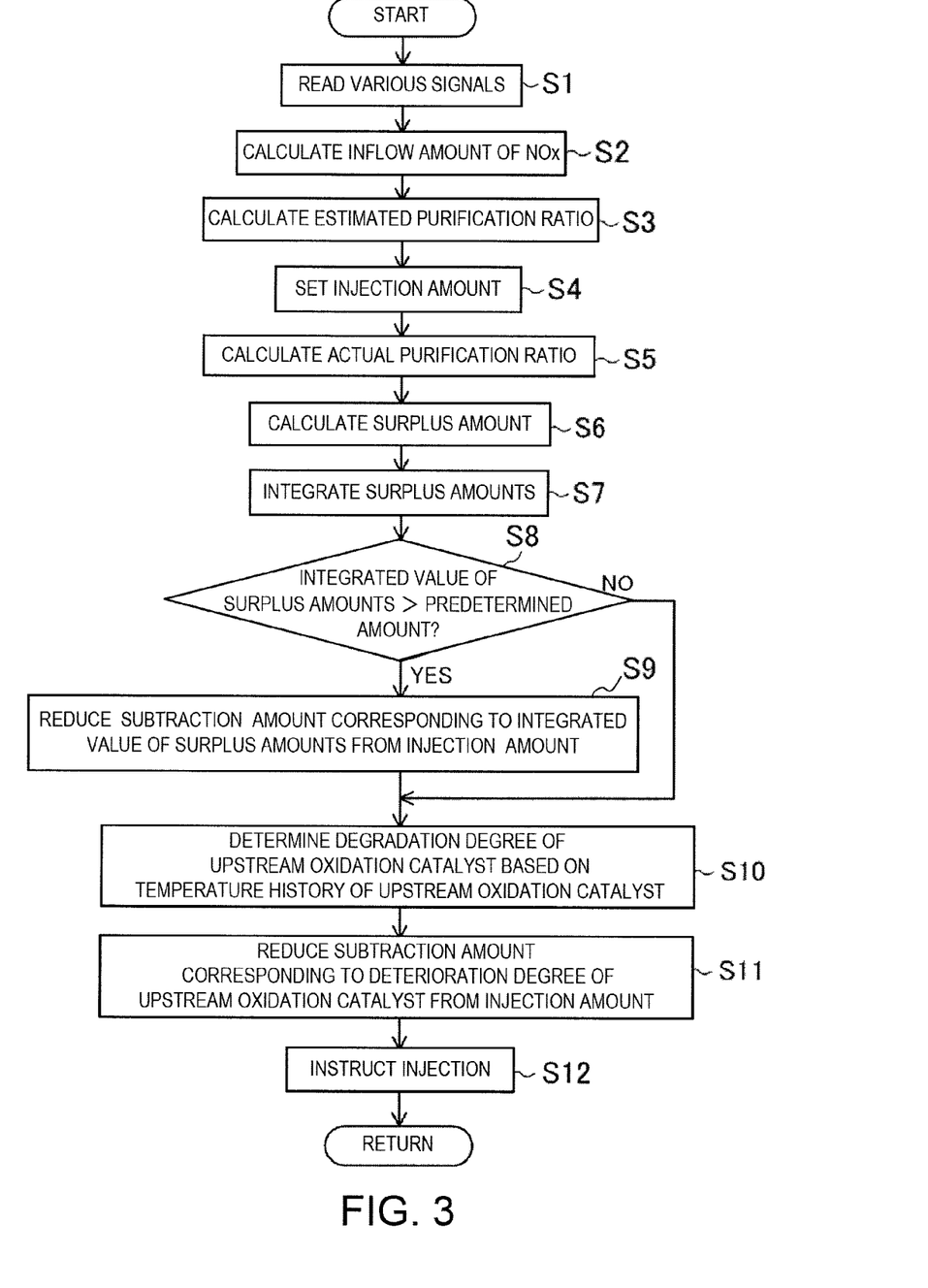
FIG. 3 is a flow chart showing an aqueous urea solution injection control by a control unit of the control system.

For an aqueous urea solution injection control by the control unit 50, operations of respective modules 50a to 50g are described in detail with reference to a flow chart (aqueous urea solution injection control routine) of FIG. 3.

First, in step S1, various signals from the sensors are read, and, in step S2, the NOx inflow amount calculating module 50a calculates the inflow amount of NOx flowing into the selective reducing catalyst 16. That is, because the amount of NOx exhausted from the engine 1 (that is, the amount of NOx flowing into the selective reducing catalyst 16) is practically determined by an operational condition of the engine 1 (e.g., engine speed and load) obtained based on the inputted signals from, for example, the engine speed sensor 31 and the intake air amount sensor 32, the inflow amount of NOx flowing into the selective reducing catalyst 16 is calculated based on the (engine) operational condition.

In this embodiment, a concentration C of NOx (unit: ppm) and a flow amount Qg of exhaust gas (unit: g/s) are calculated, using a map created in advance, based on the operational condition of the engine 1, and the inflow amount Qi (unit: g/s) of NOx is calculated from the following equation.

$$Qi = C \times Qg \times \gamma / 1000000 \quad (1)$$

Here, "$\gamma$" is a specific gravity of NOx (a concentration ratio of NO to $NO_2$ is a value set in advance).

Note that, as an alternative to the method of calculating the NOx inflow amount as above, it may be calculated by arranging a NOx sensor, similar to the NOx sensor 24, upstream of the selective reducing catalyst 16 (upstream of the upstream oxidation catalyst 11, or between the DPF 12 and the selective reducing catalyst 16), and based on an input signal from the NOx sensor (a signal from the NOx sensor which is the NOx concentration level within exhaust gas).

Next, in step S3, the estimated purification ratio calculating module 50b calculates an estimated purification ratio $\eta a$ of NOx purified by the selective reducing catalyst 16, based on the operational condition of the engine 1 (e.g., the engine speed and load). That is, the estimated purification ratio calculating module 50b obtains the flow amount and temperature of exhaust gas flowing into the selective reducing catalyst 16 to calculate the estimated purification ratio $\eta a$ based on the obtained flow amount and temperature of exhaust gas using a map created in advance. Here, the temperature is obtained in consideration of the detected value of the second temperature sensor 22.

Next, in step S4, based on the inflow amount Qi of NOx calculated by the NOx inflow amount calculating module 50a and the estimated purification ratio 11a calculated by the estimated purification ratio calculating module 50b, the injection amount setting module 50c calculates and sets the injection amount Ia (unit: g/s) of aqueous urea solution from the following equation.

$$Ia = Qi \times \eta a \times k \quad (2)$$

Here, "k" in Equation (2) is a conversion factor for converting to an amount of aqueous urea solution that is needed to react with the amount of NOx calculated from $Qi \times \eta a$ (the concentration ratio of NO to $NO_2$ is the set value). Note that by changing the value of the conversion factor k, the supply amount of ammonia can be calculated.

Next, in step S5, based on the inflow amount Qi of NOx calculated by the NOx inflow amount calculating module 50a and an outflow amount Qo (unit: g/s) of NOx detected by the NOx sensor 24, the actual purification ratio calculating module 50d calculates an actual purification ratio $\eta b$ of NOx purified by the selective reducing catalyst 16 from the following equation.

$$\eta b = (Qi - Qo) / Qi \quad (3)$$

Note that the NOx sensor 24 detects the concentration of NOx in the exhaust gas to be exact. However, similar to Equation (1), the concentration of NOx may be converted into the outflow amount of NOx; thereby, it can be said that the NOx sensor 24 detects the outflow amount Qo of NOx.

Next, in step S6, the correcting module 50f calculates the surplus amount unnecessary for the purification of NOx within the aqueous urea solution (ammonia) supplied to the selective reducing catalyst 16. That is, firstly, based on the actual purification ratio $\eta b$ and the inflow amount Qi of NOx (or based on the injection amount Ia of aqueous urea solution, the estimated purification ratio $\eta a$, and the actual purification ratio $\eta b$), an amount Ib (unit: g/s) of aqueous urea solution (amount of ammonia) necessary for the purification of NOx within the aqueous urea solution (ammonia) supplied to the selective reducing catalyst 16 is calculated from the following equation.

$$Ib = Qi \times \eta b \times k = Ia \times \eta b / \eta a \quad (4)$$

Further, by subtracting the amount Ib of aqueous urea solution necessary for the purification of NOx from the injection amount Ia, a surplus amount Ic (unit: g/s) is calculated. That is, $$Ic = Ia - Ib \quad (5)$$

Note that, if $\eta b > \eta a$, Ic=0.

Next, in step S7, the integrating module 50g performs the integration with the surplus amount Ic. That is, the integrating module 50g adds the latest surplus amount Ic to the integrated value of surplus amounts calculated in the step S7 of the previous routine.

Figure 4:
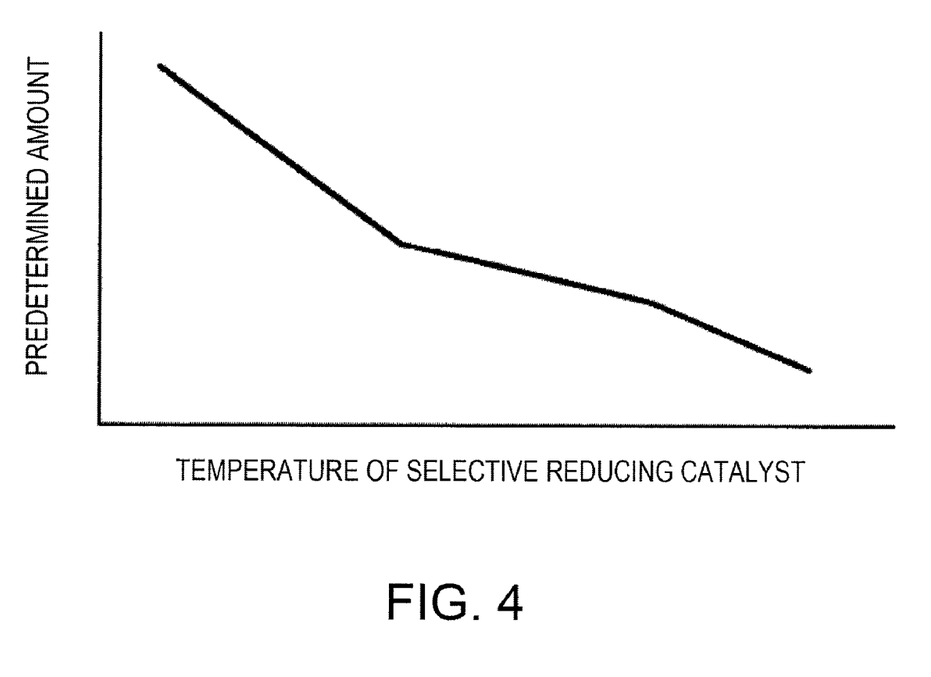
FIG. 4 is a line chart showing an example of a relationship of a temperature of a selective reducing catalyst and a predetermined amount of an additive agent which is a threshold value relative to an integrated value of surplus amounts.

Next, in step S8, the correcting module 50f determines whether the integrated value of the surplus amounts Ic is larger than the predetermined amount. The predetermined amount is the amount in which, if the integrated value of the surplus amounts Ic increases above this amount, a possibility of ammonia released into the atmosphere becomes higher due to the downstream oxidation catalyst 17 not being able to process all ammonia. As shown in FIG. 4, for example, the predetermined amount is set lower as the temperature of the selective reducing catalyst 16 (which is estimated based on the second temperature sensor 22 and the operational condition of the engine 1) becomes higher.

When the result of the determination in step S8 is yes, the process proceeds to step S10 through step S9. On the other hand, when the result of the determination in step S8 is no, the process directly proceeds to step S10.

In step S9, the correcting module 50f subtracts a subtraction amount (positive value) corresponding to the integrated value of the surplus amounts Ic from the injection amount of aqueous urea solution set in step S2. The subtraction amount becomes larger as the integrated value of the surplus amounts Ic becomes larger, and is calculated from a map created in advance or from a relational expression of the integrated value of the surplus amount Ic and the subtraction amount.

In step S10, the degradation degree determining module 50e determines the degradation degree of the upstream oxidation catalyst 11 based on the history of temperature of the upstream oxidation catalyst 11. The temperature of the upstream oxidation catalyst 11 is the temperature detected by the first temperature sensor 21, and, while the engine 1 is in operation, the temperature readings are stored in the memory device in the control unit 50 along with time information. The history of temperature information from when the engine 1 was started for the very first time immediately after the manufacturing until the current time is stored in the memory device. The degradation degree determining module 50*e* calculates a time integral value of the temperature of the upstream oxidation catalyst 11 based on the history of temperature, and determines that the degradation degree of the upstream oxidation catalyst 11 is larger (that is the oxidation performance of NO is low) as the time integral value becomes greater. Note that the determination of the degradation degree of the upstream oxidation catalyst 11 may be executed anywhere between steps S1 and S11 (described later).

Here, in step S4, the injection amount of aqueous urea solution is calculated where the upstream oxidation catalyst 11 is presumed to be not at all degraded. However, when the degradation degree of the upstream oxidation catalyst 11 becomes larger (the oxidation performance of NO becomes lower), the concentration ratio of NO to $NO_2$ in NOx flowing into the selective reducing catalyst 16 also becomes larger, thereby causing an increase in surplus ammonia unnecessary for the purification of NOx if aqueous urea solution is injected by the injection amount calculated in step S4. That is, as described above, the amount of ammonia that is needed for reducing NO by the selective reducing catalyst 16 is less than the amount of ammonia that is needed for reducing $NO_2$. Therefore, when NO increases due to the degradation of the upstream oxidation catalyst 11, the amount of ammonia necessary for the purification of NOx is reduced by the corresponding amount, thereby causing the increase in surplus ammonia when injected with the amount where the upstream oxidation catalyst 11 is presumed to be not degraded.

Figure 5:
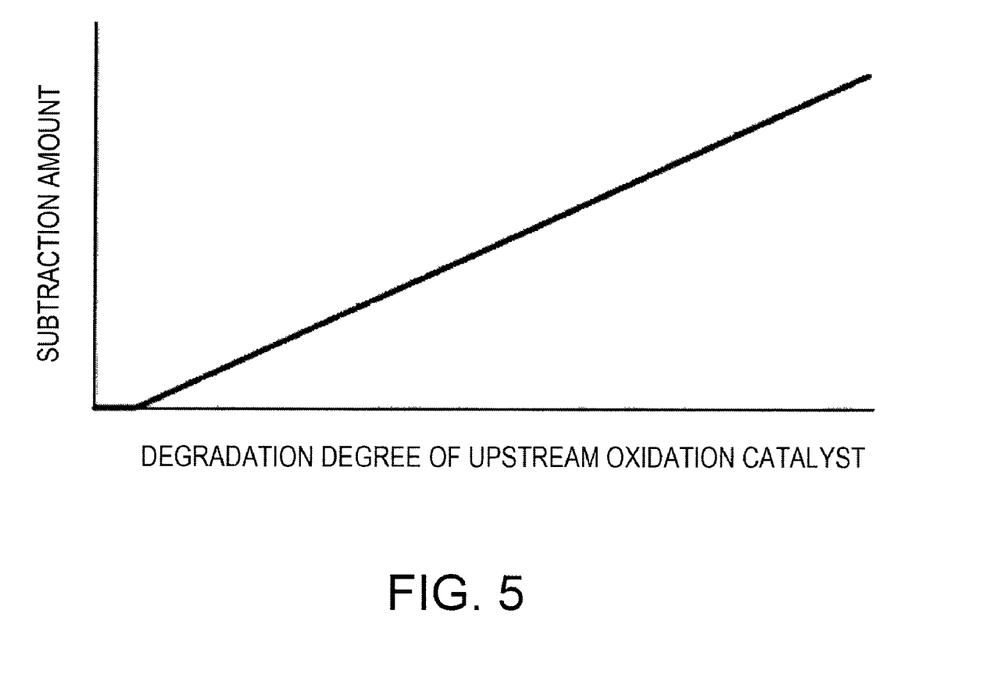
FIG. 5 is a line chart showing an example of a relationship of a degradation degree of an upstream oxidation catalyst and a subtraction amount of an injection amount of aqueous urea solution.

Thus, in step S11, the correcting module 50*f* subtracts (corrects) a subtraction amount (positive value) corresponding to the degradation degree of the upstream oxidation catalyst 11 from the injection amount of aqueous urea solution set in step S4 or the injection amount of aqueous urea solution subtracted in step S9. As shown in FIG. 5, for example, the subtraction amount corresponding to the degradation degree of the upstream oxidation catalyst 11 becomes larger as the degradation degree of the upstream oxidation catalyst 11 becomes larger. That is, the correction module 50*f* subtracts more from the injection amount of aqueous urea solution as the degradation degree of the upstream oxidation catalyst 11 becomes larger. Note that, in this embodiment, in a case where there is no degradation of the upstream oxidation catalyst 11 or there is substantially no degradation of the upstream oxidation catalyst 11 (when the time integral value is smaller than the predetermined value), it is determined that the correction is not necessary, and the subtraction amount corresponding to the degradation degree is set at 0. In other cases, it is determined that the correction is necessary, and the injection amount of aqueous urea solution is subtracted by the subtraction amount (positive value) corresponding to the degradation degree.

Next, in step S12, the control unit 50 transmits an injection instruction to the aqueous urea solution injection nozzle 13 so that aqueous urea solution is injected by the injection amount set in step S4, the subtracted injection amount if the injection amount is subtracted in step S9, or the injection amount subtracted (corrected) in step S11. The aqueous urea solution injection nozzle 13 receives the injection instruction, and injects aqueous urea solution by the injection amount according to the injection instruction. That is, when the injection amount of aqueous urea solution is corrected based on the degradation degree of the upstream oxidation catalyst 11, the aqueous urea solution injection nozzle 13 injects aqueous urea solution by the corrected injection amount, and, on the other hand, when the injection amount of aqueous urea solution is not corrected based on the degradation degree of the upstream oxidation catalyst 11, the aqueous urea solution injection nozzle 13 injects aqueous urea solution by the injection amount set in step S4 (or the corrected injection amount if the injection amount is corrected in step S9). Note that in this embodiment, the aqueous urea solution injection nozzle 13 does not inject aqueous urea solution continuously, but it injects intermittently at the constant frequency T. Therefore, the injection amount (unit: g) that should be injected in a single injection from the aqueous urea solution injection nozzle 13 is the value obtained by multiplying either the injection amount set in step 4, the subtracted injection amount if the injection amount is subtracted in step S9, or the injection amount subtracted in step S11, by the injecting frequency T.

Thus, in this embodiment, the injection amount of aqueous urea solution is set based on the inflow amount of NOx and the estimated purification ratio, while the degradation degree of the upstream oxidation catalyst 11 arranged upstream of the selective reducing catalyst 16 is determined, and the injection amount of aqueous urea solution is corrected based on the degradation degree of the upstream oxidation catalyst 11. Therefore, even if the upstream oxidation catalyst 11 is degraded, the suitable amount of aqueous urea solution is supplied to the selective reducing catalyst 16, and, thereby, the surplus amount of aqueous urea solution (amount of ammonia) unnecessary for the purification of NOx can be decreased, and the amount of ammonia exhausted from an outlet of the exhaust passage 3 to the atmosphere can be decreased.

Note that in this embodiment, the degradation degree of the upstream oxidation catalyst 11 is determined based on the time integral value of temperature of the upstream oxidation catalyst 11. However, without limiting to this, it may be determined, for example, based on a time length for the temperature of the upstream oxidation catalyst 11 to reach a predetermined temperature (the temperature which the degradation of the upstream oxidation catalyst 11 advances) or higher. Here, the degradation degree of the upstream oxidation catalyst 11 is determined to be larger as the time length becomes longer.

Further, in this embodiment, the injection amount of aqueous urea solution is subtracted based on the surplus amount unnecessary for the purification of NOx in aqueous urea solution supplied to the selective reducing catalyst 16. However, the technique of this embodiment may be applied to a case where such subtraction of an injection amount by the surplus amount is not performed. For example, by calculating the injection amount of aqueous urea solution based on the inflow amount Qi of NOx and the actual purification ratio ηb, the subtraction of the injection amount by the surplus amount becomes unnecessary, and, in this case, the injection amount of aqueous urea solution calculated based on the inflow amount Qi of NOx and the actual purification ratio ηb may be corrected based on the degradation degree of the upstream oxidation catalyst 11. Alternatively, the injection amount of aqueous urea solution calculated based on the inflow amount Qi of NOx and the estimated purification ratio ηa may be left completely uncorrected by the surplus amount, but may be corrected based on the degradation degree of the upstream oxidation catalyst 11. Further, as long as the injection amount, prior to the correction based on the degradation degree of the upstream oxidation catalyst 11, is set based on the inflow amount of NOx flowing into the selective reducing catalyst 16, the injection amount may be calculated in any other way.

The technique of the embodiment can also be applied to a method and a system for exhaust gas purification, in which, by supplying an additive agent (reducing agent) to a selective reducing catalyst arranged to an exhaust passage of an engine, exhaust gas of the engine is purified.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A method for purifying exhaust gas from an engine that arranges in an exhaust passage of the engine a selective reducing catalyst and an oxidation catalyst upstream of the selective reducing catalyst, comprising:

calculating an amount of NOx that flows into the selective reducing catalyst;

setting an amount of an additive agent to be supplied to the selective reducing catalyst based on the calculated amount of the NOx that flows into the selective reducing catalyst;

determining a degradation degree of the oxidation catalyst;

determining whether a correction is necessary to be made to the amount of the additive agent to be supplied based on the determined degradation degree of the oxidation catalyst;

correcting the amount of the additive agent to be supplied when the correction is determined to be necessary; and supplying the additive agent to the selective reducing catalyst in the corrected amount of the additive agent if the amount is determined to be corrected and in an uncorrected amount of the additive if the amount of the additive agent is determined not to be corrected.

2. The method for purifying exhaust gas as defined in claim 1, wherein, if the correction is determined to be necessary, the amount of the additive agent to be supplied is decreased more greatly as the determined degradation degree increases.

3. The method for purifying exhaust gas as defined in claim 1, wherein the determination of the degradation degree is made based on a history of temperature change of the oxidation catalyst.

4. The method for purifying exhaust gas as defined in claim 2, wherein the determination of the degradation degree is made based on a history of temperature change of the oxidation catalyst.

5. The method for purifying exhaust gas as defined in claim 3, wherein the determination of the degradation degree is made in such a manner that a time integration value of a temperature of the oxidation catalyst is calculated based on the history of temperature change of the oxidation catalyst and the degradation degree is determined to be larger as the time integration value increases.

6. The method for purifying exhaust gas as defined in claim 4, wherein the determination of the degradation degree is made in such a manner that a time integration value of a temperature of the oxidation catalyst is calculated based on the history of temperature change of the oxidation catalyst and the degradation degree is determined to be larger as the time integration value increases.

7. A system for purifying exhaust gas from an engine comprising, a selective reducing catalyst provided in an exhaust passage of the engine;

an oxidation catalyst provided upstream of the selective reducing catalyst in the exhaust passage;

an additive agent supplying device provided in the exhaust passage to supply an additive agent to the selective reducing catalyst;

a controller configured to:

calculate an amount of NOx that flows into the selective reducing catalyst;

set an amount of the additive agent to be supplied to the selective reducing catalyst based on the calculated amount of the NOx that flows into the selective reducing catalyst;

determine a degradation degree of the oxidation catalyst;

determine whether a correction is necessary to be made to the amount of the additive agent to be supplied based on the determined degradation degree of the oxidation catalyst;

correct the amount of the additive agent to be supplied when the correction is determined to be necessary; and control the additive agent supplying device to supply the additive agent to the selective reducing catalyst in the corrected amount if the amount of the additive agent is determined to be corrected and in an uncorrected amount if the amount of the additive agent is determined not to be corrected.

* * * * *